United States Patent [19]
Gardner

[11] Patent Number: 5,401,293
[45] Date of Patent: Mar. 28, 1995

[54] WASTE PETROLEUM FILTER RECYCLING PROCESS

[75] Inventor: Kenneth G. Gardner, Kelowna, Canada

[73] Assignee: Canadian Oil Filter Recovery Corp., Kelowna, Canada

[21] Appl. No.: 114,477

[22] Filed: Aug. 31, 1993

[51] Int. Cl.$^6$ .......................... B08B 7/00; C21D 11/00
[52] U.S. Cl. ....................................................... 75/403
[58] Field of Search ............................................. 75/403

[56] References Cited

U.S. PATENT DOCUMENTS

| | | | |
|---|---|---|---|
| 4,548,651 | 10/1985 | Ramsey | 75/403 |
| 5,196,154 | 3/1993 | Celi | 75/403 |
| 5,198,018 | 3/1993 | Agarwal | 75/403 |

*Primary Examiner*—Peter D. Rosenberg
*Attorney, Agent, or Firm*—Christie, Parker & Hale

[57] ABSTRACT

Filters contaminated with hydrocarbons are treated to reduce hydrocarbon content to acceptable levels for transportation and recycling. In one embodiment used petroleum filters are crushed and some of the hydrocarbon products released. The filters, either crushed or non-crushed, are heated in a primary chamber to a temperature of at least about 250° C., the air flow into the primary chamber is controlled and the temperature in the primary chamber is maintained within a temperature range of about 250° to 400 ° C. by application of heat and application of water sprays to carbonize hydrocarbons in the filters. The hydrocarbon vapors and water vapors from the primary chamber are condensed in a condenser and any non-condensed hydrocarbons remaining are incinerated in a secondary chamber.

19 Claims, 4 Drawing Sheets

WASTE PETROLEUM FILTER RECYCLING PROCESS

TECHNICAL FIELD

The present invention relates to recycling of used petroleum filters and filters contaminated with hydrocarbons and more specifically to a method of removing substantially all the hydrocarbons from used petroleum filters or other types of filters so both the hydrocarbons and the filter materials may be recycled.

BACKGROUND ART

Filters used for internal combustion engines, compressors, hydraulic systems and the like all have to be replaced from time to time as they become clogged with dirt and other contaminants. These contaminants can include heavy metal oxides. Such used filters are heavy with hydrocarbon liquids and present a problem with regard to disposal. Most filters contain metal casings and filter media which includes different filters generally within paper or plastic casings or inserts.

As well as petroleum filters, other types of filters that are contaminated with hydrocarbons also have to be disposed of when they have been used. Such filters may be made of charcoal, paper, or cloth. They may include filter media such as peat, sand or diatomaceous earth. Some filters may have plastic casings or the heavy casings are metal.

In the past these filters were buried in landfills. However, it has been determined that the leakage of oil out of used filters was not satisfactory and does not comply with the environmental disposal laws. Thus, initially it was decided that most of these filters should be crushed as much of the oil leaves the filters thus the hydrocarbon content of the filters could be reduced to the order of 8% to 12%. Furthermore, the crushing step reduces the volume of such filters thus requiring a smaller disposal volume, also some of the oil could be recovered and passed for recycling.

Whereas the crushing step was clearly an improvement inasmuch as the oil content was reduced, the crushed filters could still not be recycled as their hydrocarbon content was still too high. Furthermore, because of the hydrocarbon content, shipping of such filters comes under a special waste category requiring a special licence, and furthermore landfills are not accepting used filters having a hydrocarbon content greater than 3%.

To overcome this problem the crushed used filters were heated in a furnace to burn off the hydrocarbons. However, this step generally resulted in excessive black smoke due to incineration of the hydrocarbons which are not acceptable to the Canadian and U.S. Clean Air Act requirements on stack emissions. When such filters were incinerated, hydrocarbons turned to ash and carbon dioxide, carbon monoxide gases, together with heavy metal oxides and other solids and gases exited from the stack. Whereas scrubbers may be used with such a system to remove solid particles such as ash, the disposal of such ash still presented certain environmental problems. The result of incinerating the crushed used filters reduced the hydrocarbon content below 3%, thus it was now found that the incinerated crushed filters which contained primarily a mixture of steel and other metals may be recycled in steel mills and the like.

SUMMARY OF THE INVENTION

It is an aim of the present invention to provide a process and a system which first crushes used petroleum filters and then carbonizes the remaining hydrocarbon content in the crushed filters rather than incinerating the hydrocarbons. The resulting crushed carbonized filters contain mostly metal and carbon. The hydrocarbon content is reduced below 3% by weight so the crushed filters may be shipped as non-toxic waste and may be recycled in steel mills and the like.

It is a further aim of the present invention to provide a process and system to recycle used filters contaminated with hydrocarbons by carbonizing the hydrocarbon content rather than incineration.

The process utilizes controlled heating of the filters with a limited air supply to ensure that carbonization rather than incineration occurs to the hydrocarbons. Furthermore, the carbonization process avoids air pollution and meets Clean Air Act emission regulations. The process includes volatizing some of the hydrocarbons and then condensing the vaporized hydrocarbons to recover as much of the petroleum products as possible for recycling.

The present invention provides a process for recycling filters contaminated with hydrocarbons comprising the steps of: heating the filters in a primary chamber to a temperature of at least 250° C.; controlling air flow to the primary chamber; maintaining temperature in the primary chamber within a temperature range of about 250° to 400° C. by application of heat and application of water sprays to carbonize hydrocarbons in the crushed filters; condensing hydrocarbon vapours and water vapours from the primary chamber in a condenser means, and incinerating non-condensed hydrocarbons from the condenser means in a secondary chamber.

The present invention also provides a process for recycling petroleum filters comprising the steps of crushing used filters and collecting hydrocarbon products released therefrom; heating the crushed filters in a primary chamber to a temperature of at least 250° C., controlling air flow to the primary chamber, maintaining temperature in the primary chamber within a temperature range of about 250° to 400° C. by application of heat and application of water sprays to carbonize hydrocarbons in the crushed filters, condensing hydrocarbon vapours and water vapours from the primary chamber in a condenser means, and incinerating non-condensed hydrocarbons from the condenser means in a secondary chamber.

In yet a further embodiment, the present invention provides a system for recycling filters contaminated with hydrocarbons comprising: a primary chamber for the filters, the primary chamber having heating means therein to raise the temperature to a range between about 250° and 400° C.; water spray means within the primary chamber; control means to turn on the heating means and turn off the water spray means when the temperature in the primary chamber is below about 250° C. and turn off the heating means and turn on the water spray means when the temperature in the primary chamber rises above about 400° C.; condenser means for condensing hydrocarbon vapours and water vapours from the primary chamber, and a secondary chamber to incinerate non-condensed hydrocarbons from the condenser means.

Still further the present invention provides a system for recycling petroleum filters comprising crushing means to crush used filters and reduce hydrocarbon content to below about 12% by weight; a primary chamber for the crushed used filters, the primary chamber having heating means therein to raise the temperature to a range between about 250° and 400° C.; water spray means within the primary chamber, control means to turn on heating means and turn off the water spray means when the temperature in the primary chamber is below about 250° C., and turn off the heating means and turn on the water spray means when the temperature in the primary chamber rises above about 400° C.; condenser means for condensing hydrocarbon vapours and water vapours from the primary chamber, and a secondary chamber to incinerate non-condensed hydrocarbons from the condenser means.

BRIEF DESCRIPTION OF DRAWINGS

In drawings which illustrate embodiments of the present invention.

MODES FOR CARRYING OUT THE INVENTION

Waste petroleum filters for recycling contain all types of waste petroleum products including lubricant oils, diesel oils, hydraulic fluid, transmission fluid, gasoline and glycol products. The filters are preferably inspected prior to recycling and all rubber rings and gaskets are removed from the filters prior to recycling. The rubber rings themselves may be thermally processed under very specific heat conditions so that the oil is removed from the rubber ring or gasket leaving the ring decontaminated of any hydrocarbon contaminants. This allows the rubber in the rings and gaskets to be recycled. For example, rubber mat manufacturers are able to reuse decontaminated rubber rings gaskets. The recycling of the rubber rings and gaskets does not constitute part of the present invention.

Figure 1:
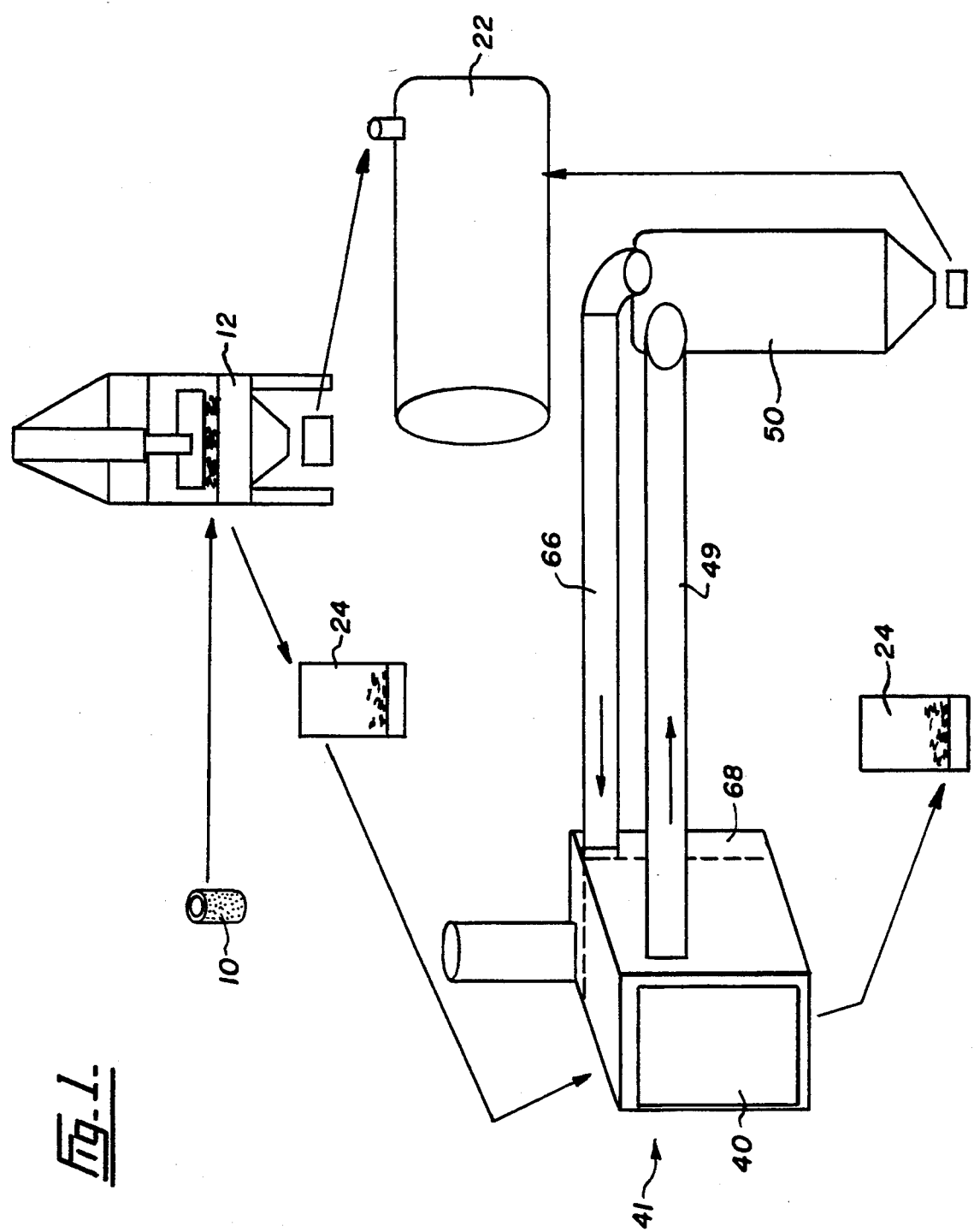
FIG. 1 is a schematic diagram showing the equipment for recycling petroleum filters according to one embodiment of the present invention.

The waste filters are preferably sorted out, several filters of similar types are put together, preferably end downwards, and placed in a press. As shown in FIG. 1 filters 10 are crushed in a press 12. It is preferably to crush filters 10 of the same size and in one embodiment five filters 10 are pressed together in a press 12 which produces 200,000 lbs. thrust thus providing a crushing load of 40,000 lbs. per filter.

Figure 2:
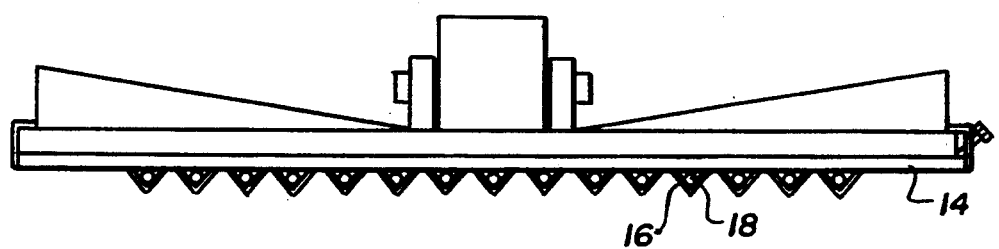
FIG. 2 is a side elevational view showing a crushing plate for crushing used filters.
Figure 3:
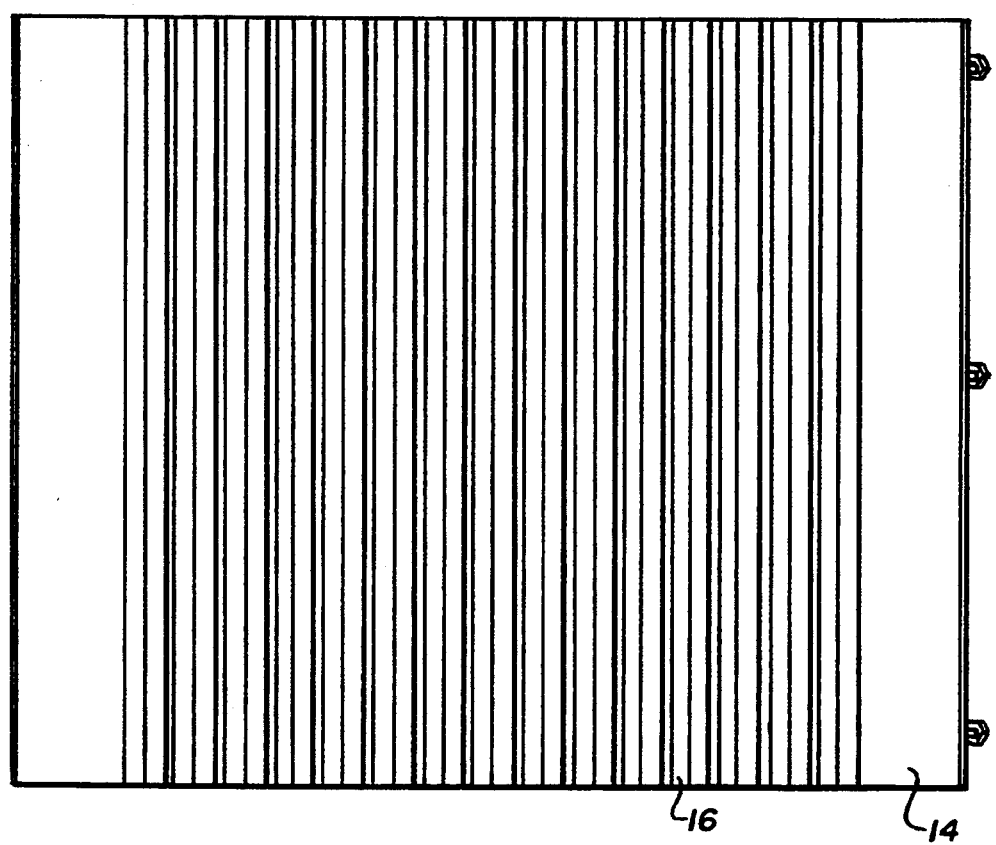
FIG. 3 is a bottom view of the crushing plate shown in FIG. 2.

FIGS. 2 and 3 illustrate a crushing plate 14 which has a series of angles 16 with circular rods 18 acting as supports to prevent the angles 16 from distorting during the crushing step. The angles 16 form teeth that provide a concentrated force at the corner of the angles 16 or extremities of the teeth and this assists in the crushing step by providing a more concentrated force in lines representing the teeth extremities which in turn assists in squeezing the waste hydrocarbon products out of the crushed filters 10. As shown in FIG. 1, the oil squeezed from the crushed filters is captured beneath the press 12 in a container 20 and transferred to a waste oil storage tank 22. The crushing step results in the hydrocarbon content of the filters being reduced to a range of about 8 to 12% by weight. It is preferable that this range of hydrocarbon content be attained in order for the thermal processing to work effectively.

The quantity of filters crushed in the press tends to vary dependent upon the size of the filters and the size of the press. For instance, smaller filters may be crushed six at a time, whereas the large filters such as large diesel engine filters can only be crushed two at a time. The crushing force of 40,000 lbs. per filter tends to be arbitrary depending upon the size of the filter, the larger filters generally require a greater crushing force than the smaller filters. In general, however, the force of 40,000 lbs. per filter is satisfactory for most filters.

Figure 4:
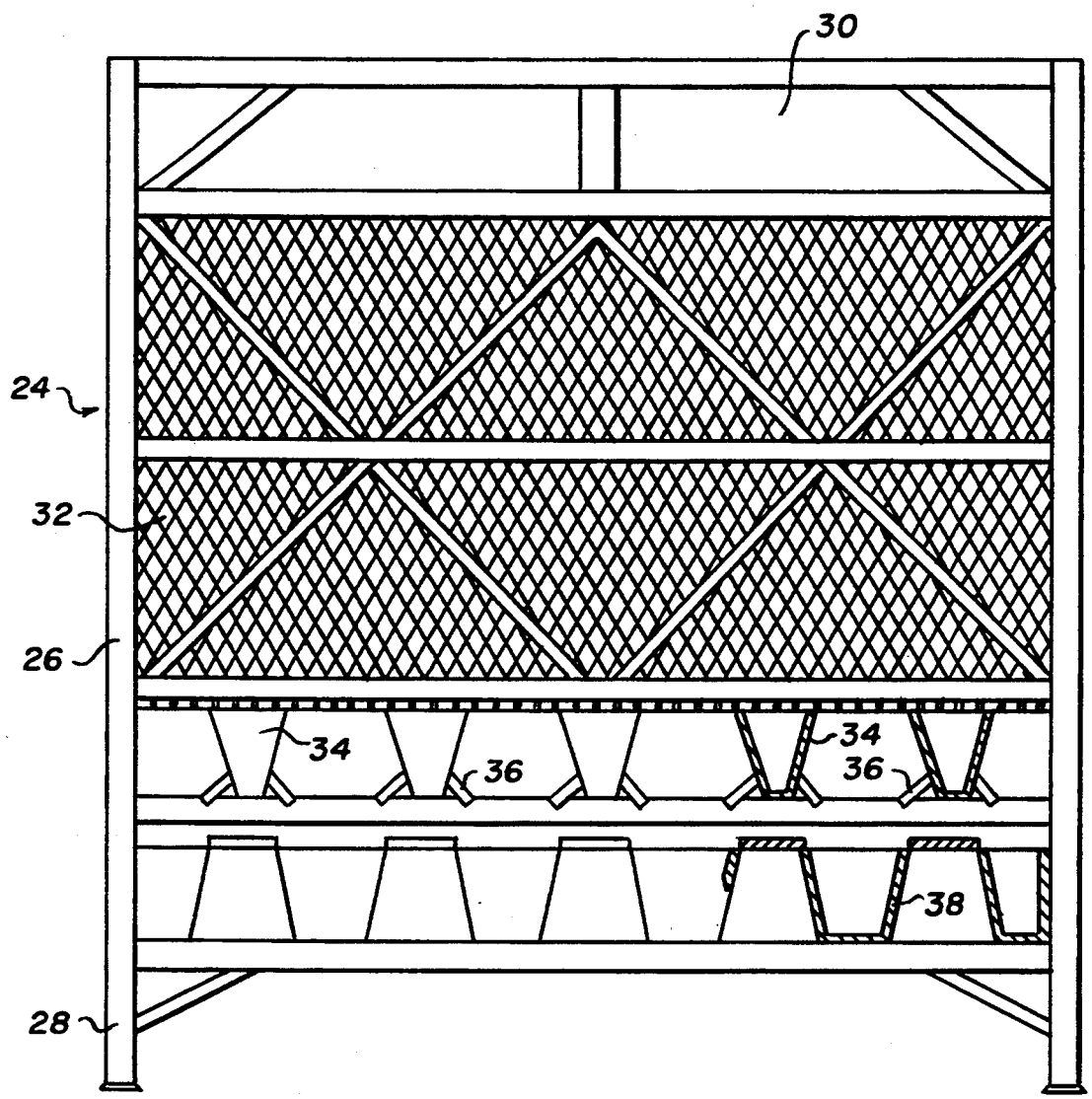
FIG. 4 is a side elevational view showing a multiple filter tray for containing crushed used filters for heating in a primary chamber.

The crushed filters 10 are placed in a multiple filter holding tray 24 as shown in FIG. 4. The tray 24 has a steel frame 26 with raised legs 28 for a forklift. There is also a forklift aperture 30 at the top of the frame 26. An expanded metal mesh sides and bottom 32 are provided to contain the crushed filters. At this time the filters have the hydrocarbon content of about 8 to 12% by weight. A first row of evaporator troughs 34 is positioned below the expanded metal base, and drain pipes 36 from this first row of troughs pass into a second row of evaporator troughs 38. The second row of troughs 38 is arranged so that oil dripping into the first row of troughs 34 passes through the drain pipes 36 into the second row of troughs 38. At least one end of the second row of troughs 38 is open so that oil or hydrocarbon fluids drain out of at least one end of the tray 24.

Figure 5:
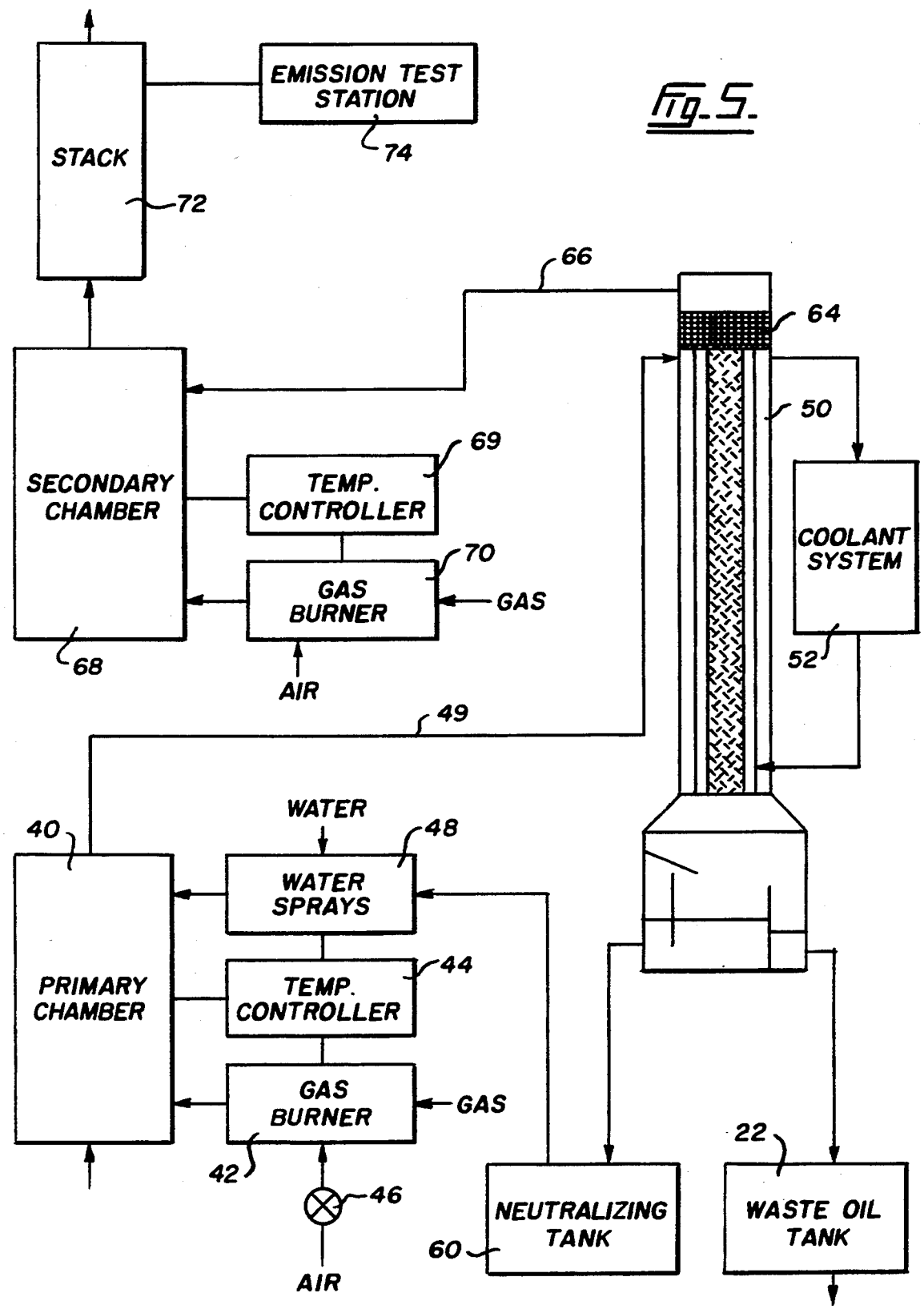
FIG. 5 is a schematic flow diagram showing the heating and condensing steps for recycling crushed used filters.

After crushing, the crushed filters are placed in the tray 24 and then preferably left for a day to permit as much oil as possible to drip down into the troughs 34,38 and drain away. A collecting container or tank is placed at an end of the tray 24 to collect oil dripping from open ends of the troughs 38. The tray 24 with crushed filters 10 therein, is then placed into the primary chamber 40 of the thermal processor 41. The thermal processing is illustrated in FIG. 5.

Many types of filters to be processed are not crushed first. Air filters that are contaminated with hydrocarbons because they are used in an atmosphere to remove hydrocarbons, may be recycled, but need not be crushed. The non-crushable filter may include cloth, charcoal, paper, sand, peat, diatomaceous earth and other types. These filters are placed into the tray 24 without first being crushed.

The multiple filter holding tray 24 is designed to permit heated gases to pass upwards through the tray 24 in the primary chamber 40. Any oil or hydrocarbon products drain to the bottom of the primary chamber 40 and provision is made for the liquids to drain out of the chamber, preferably passing to the waste oil storage tank 22 as shown in FIG. 1.

In the primary chamber 40 there is a preliminary heating step where the chamber is heated up to a temperature of about 250° C. In this preliminary heating step, hydrocarbon products become more liquid and some drip into the troughs 34 and 38 and drain out of the primary chamber 40. Heating is by a gas burner 42 which projects a flame straight inside the primary chamber 40. During this preliminary step, little flaming occurs, however, if there are volatile hydrocarbon products such as gasoline present, then flaming does occur. The primary chamber 40 has a temperature controller 44 which constantly measures the temperature. The gas burner 42 has a controlled air inlet and gas inlet. The quantity of air into the primary chamber 40 is controlled by valve 46. By limiting the quantity of air, the flaming in the chamber is controlled and if the temperature in the primary chamber 40 becomes too high, then the gas burner 42 is turned off and water sprays 48 are turned on to douse the flames in the primary chamber 40.

A second heating step follows the preliminary step and in this second step the temperature in the primary chamber is kept within the range of approximately 250° to 400° C. This temperature range is controlled by the temperature controller 44 which measures the temperature in the primary chamber 40 and either turns on the gas burner 42 or, alternatively, if flaming occurs, turns off the gas burner 42 and turns on the water sprays 48.

Because the flow of air into the primary chamber is controlled, incineration in the chamber is kept to a minimum and carbonization of some of the hydrocarbons occurs. Some hydrocarbons are volatized when heated and a combination of hydrocarbon vapour, and other gases together with water vapour resulting from the water sprays 48 are transferred in a duct 49 from the primary chamber 40 to a condenser 50. The condenser 50 includes a circulating coolant system 52. The temperature of the hydrocarbon gases and water vapours entering the condenser 50 is preferably about 300° C. The cooling system 52 cools the gases and vapours resulting in condensation of the vapours occurring and hydrocarbon liquids and water drop to the bottom of the condenser 50 and are collected in a collecting tank 54. A weir 56 at one side of the tank 54 permits the oil or hydrocarbon liquids which settle on top of the water to fall into a separate compartment 58 where they pass to the waste oil storage tank 22 for further recycling. The water drains away to a neutralizing tank 60 where it is returned to the water sprays 48 of the primary chamber 40. In some filters, plastic materials including polyvinyl chloride, may be vaporized and passed into the condenser 50. This results in some acids being present in the water. Thus, a slaked lime neutralizer is provided in the tank 60 to neutralize any acids present.

Non-condensable gases pass upwards in the condenser 50 through a demister 64 and then flow through an outlet duct 66 to a secondary chamber 68 as shown in FIG. 5. The non-condensable gases include trace hydrocarbons. A temperature controller 69 is provided in the secondary chamber 68 for controlling a gas burner 70. Make up air is also supplied to the secondary chamber 68 and incineration occurs within the second chamber 68 to incinerate hydrocarbon traces. The flue gas from the secondary chamber is preferably at about 800° C. and passes to the stack 72. An emission test station 74 is provided on the stack 72 to ensure that the emissions are within the emission control regulations.

The process time for the filters in the primary chamber 40 in one embodiment is a five hour cycle including a preliminary heating step and a second step. The preliminary step is primarily to heat the filters up to the vaporization temperature of the hydrocarbons and at the same time permit any hydrocarbon liquids present to drain away.

When the filters leave the primary chamber 40 following the heating process in the thermal processor 41, the majority of the hydrocarbons has either been volatized and left the chamber 40 or has been carbonized and carbon together with heavy metals are retained with the metal of the filters. The hydrocarbon content of the processed filters is below 3% and often as low as 0 to 1½%. Thus, the processed filters may be shipped as an ordinary waste shipment rather than a special license for hazardous waste being required. Furthermore, the processed filters because of their low hydrocarbon content may be reused in steel mills and the like which is not acceptable if the hydrocarbon content is above 3%.

Plastic, paper and other materials that make up filters are carbonized. Heavy metals remain in the carbon, the acidic compounds are volatized and condensed, and the condensed acids are neutralized by a scrubber or by slake lime as shown in the neutralizing tank 60.

In one embodiment 500 lbs. of waste petroleum filters were first crushed and then processed in five hours. At the 8 to 12% hydrocarbon allowance of crushed filters, the recovery of hydrocarbon liquids after processing was 7 to 8 gallons. The processed crushed filters had a hydrocarbon content of approximately 1½% by weight and were suitable for use in a steel mill.

Various changes may be made to the embodiments disclosed herein without departing from the scope of the present invention which is limited only by the following claims.

The embodiments of the present invention in which an exclusive property or privilege is claimed are defined as follows:

1. A process for recycling filters which include a filter medium contained in a metal casing and contaminated with a combustible hydrocarbon liquid, comprising the steps of:
   heating the filters in a primary chamber to a temperature of at least 250° C.;
   controlling air flow to the primary chamber;
   maintaining temperature in the primary chamber within a temperature range of about 250° to 400° C. by application of heat and application of water sprays to carbonize hydrocarbons in the filters and produce hydrocarbon vapours and water vapours;
   separating the metal casings and carbonized hydrocarbons in the filters;
   condensing the hydrocarbon vapours and water vapours from the primary chamber in a condenser means, thereby yielding condensed hydrocarbons and water and non-condensed hydrocarbons;
   separating the condensed hydrocarbons and water; and
   incinerating the non-condensed hydrocarbons from the condenser means in a secondary chamber.

2. The process for recycling filters contaminated with hydrocarbons according to claim 1 wherein the air flow to the primary chamber is controlled to:
   substantially restrict incineration of hydrocarbons within the primary chamber;
   permit hydrocarbon vapours and water vapours to flow from the primary chamber into the condenser means, and
   permit non-condensed hydrocarbons to flow from the condenser means to the secondary chamber for incineration.

3. The process for recycling filters contaminated with hydrocarbons according to claim 1 wherein the temperature in the primary chamber is monitored to provide carbonization and volatization of hydrocarbons with minimum incineration, and
   temperature in the secondary chamber is monitored to provide maximum possible incineration of the non-condensed hydrocarbons.

4. A process for recycling petroleum filters which include a filter medium contained in a metal casing and contaminated with a combustible hydrocarbon liquid, comprising the steps of:

crushing used filters and collecting hydrocarbon products released therefrom;

heating the crushed filters in a primary chamber to a temperature of at least 250° C.;

controlling air flow to the primary chamber;

maintaining temperature in the primary chamber within a temperature range of about 250° to 400° C. by application of heat and application of water sprays to carbonize hydrocarbons in the crushed filters and produce hydrocarbon vapours and water vapours;

separating the metal casings and carbonized hydrocarbons in the filters;

condensing the hydrocarbon vapours and water vapours from the primary chamber in a condenser means, thereby yielding condensed hydrocarbons and water and non-condensed hydrocarbons;

separating the condensed hydrocarbons and water; and incinerating the non-condensed hydrocarbons from the condenser means in a secondary chamber.

5. The process for recycling petroleum filters according to claim 4 wherein the air flow to the primary chamber is controlled to:

substantially restrict incineration of hydrocarbons within the primary chamber;

permit hydrocarbon vapours and water vapours to flow from the primary chamber into the condenser means, and permit non-condensed hydrocarbons to flow from the condenser means to the secondary chamber for incineration.

6. The process for recycling petroleum filters according to claim 4 wherein rubber gaskets are removed from used filters prior to crushing.

7. The process for recycling petroleum filters according to claim 4 wherein the hydrocarbon content by weight of the used filters is in the range of 8 to 12% after crushing and before heating in the primary chamber.

8. The process for recycling petroleum filters according to claim 4 wherein the crushing occurs in a press with a crusher plate having teeth to provide increased crushing force at extremities of the teeth.

9. The process for recycling petroleum filters according to claim 4 wherein the crushed filters are contained in a multiple filter holding tray in the primary chamber, the multiple filter tray having evaporator troughs and drains for liquid hydrocarbons to evaporate or drain from the primary chamber.

10. The process for recycling petroleum filters according to claim 4 wherein the crushed filters are heated with a gas burner.

11. The process for recycling petroleum filters according to claim 10 wherein the temperature in the primary chamber is maintained by turning on the gas burner so the temperature rises to a predetermined high level, turning on the water sprays and turning off the gas burner if the temperature rises above the high level to extinguish flaming, and turning on the gas burner again when the temperature drops to a predetermined low level.

12. The process for recycling petroleum filters according to claim 4 wherein heavy metals are entrapped in the carbonized hydrocarbons in the crushed filter after heating in the primary chamber.

13. The process for recycling petroleum filters according to claim 4 wherein the condensed hydrocarbons and water are separated after being condensed in the condenser means.

14. The process for recycling petroleum filters according to claim 13 wherein the water is neutralized and recycled for use in the water sprays for the primary chamber.

15. The process for recycling petroleum filters according to claim 4 wherein incineration of the non-condensed hydrocarbons in the secondary chamber occurs at a temperature above about 500° C.

16. The process for recycling petroleum filters according to claim 15 wherein incineration in the secondary chamber occurs with a gas burner.

17. The process for recycling petroleum filters according to claim 4 wherein the crushed filters are first heated to a temperature of at least 250° C. in the primary chamber while permitting hydrocarbon liquid to drain from the bottom of the primary chamber.

18. The process for recycling petroleum filters according to claim 4 wherein the temperature in the primary chamber is monitored to provide carbonization and volatization of hydrocarbons with minimum incineration, and temperature in the secondary chamber is monitored to provide maximum possible incineration of the non-condensed hydrocarbons.

19. The process for recycling petroleum filters according to claim 4 wherein the crushed filters are maintained in the primary chamber within the temperature range of about 250° to 400° C. for approximately five hours.

* * * * *